(12) United States Patent
Maruta

(10) Patent No.: US 9,124,479 B2
(45) Date of Patent: Sep. 1, 2015

(54) WIRELESS BASE STATION RECEIVING DEVICE, AND SIGNAL DEMODULATION METHOD AND PROGRAM USED THEREIN

(75) Inventor: Yasushi Maruta, Tokyo (JP)

(73) Assignee: NEC CORPORATION, Tokyo (JP)

( * ) Notice: Subject to any disclaimer, the term of this patent is extended or adjusted under 35 U.S.C. 154(b) by 373 days.

(21) Appl. No.: 13/383,373

(22) PCT Filed: May 20, 2010

(86) PCT No.: PCT/JP2010/003386
§ 371 (c)(1),
(2), (4) Date: Jan. 10, 2012

(87) PCT Pub. No.: WO2011/007488
PCT Pub. Date: Jan. 20, 2011

(65) Prior Publication Data
US 2012/0264467 A1 Oct. 18, 2012

(30) Foreign Application Priority Data

Jul. 15, 2009 (JP) ................................. 2009-166452

(51) Int. Cl.
*H04B 1/10* (2006.01)
*H04L 27/26* (2006.01)
(Continued)

(52) U.S. Cl.
CPC ......... *H04L 27/2649* (2013.01); *H04J 11/0036* (2013.01); *H04L 1/0002* (2013.01); *H04L 1/0038* (2013.01); *H04L 5/0007* (2013.01)

(58) Field of Classification Search
CPC . H04J 11/0036; H04L 1/0002; H04L 1/0038; H04L 27/2649; H04L 5/0007; H04W 36/30
See application file for complete search history.

(56) References Cited

U.S. PATENT DOCUMENTS 6,615,030 B1 * 9/2003 Saito et al. ..................... 455/296
6,654,623 B1 * 11/2003 Kastle ............................ 600/336

(Continued)

FOREIGN PATENT DOCUMENTS

JP 2001223673 8/2001
JP 2002271233 A 9/2002

(Continued)

OTHER PUBLICATIONS

International Search Report for PCT/JP2010/003386, mailed Jul. 13, 2010.

*Primary Examiner* — Bobbak Safaipour
(74) *Attorney, Agent, or Firm* — Sughrue Mion, PLLC

(57) ABSTRACT

In order to improve the efficiency of user signal demodulation processing including interference suppression processing, a wireless receiving unit (10) forming a wireless base station receiving device (1) receives a wireless signal (101) including plural user signal components respectively transmitted from plural mobile terminals. An interference suppression unit (20) determines whether to perform a predetermined interference suppression processing upon demodulation of each user signal component from the wireless signal (101) (base band signal (102) output from the wireless receiving unit (10)) according to a reception quality (reception quality information (107)) of each user signal component that needs to be guaranteed for each mobile terminal and a transmission rate (transmission rate information (108)) of each user signal component determined for each mobile terminal. At this time, the interference suppression unit (20) causes a number of interference suppression demodulation blocks (30) corresponding to the number of user signal components determined to be subjected to the interference suppression processing to operate, and causes a number of normal demodulation blocks (40) corresponding to the number of user signal components determined not to be subjected to the interference suppression processing to operate.

18 Claims, 5 Drawing Sheets

(51) Int. Cl.
*H04J 11/00* (2006.01)
*H04L 1/00* (2006.01)
*H04L 5/00* (2006.01)

(56) References Cited

U.S. PATENT DOCUMENTS 7,747,292 B2 * 6/2010 Mezer et al. ............ 455/570
2012/0155341 A1 * 6/2012 Yamamoto et al. ......... 370/281

FOREIGN PATENT DOCUMENTS

| | | |
|---|---|---|
| JP | 2003051764 A | 2/2003 |
| JP | 2003152682 A | 5/2003 |
| JP | 2003255693 A | 9/2003 |
| JP | 2004153527 A | 5/2004 |
| JP | 2005354255 A | 12/2005 |

* cited by examiner

WIRELESS BASE STATION RECEIVING DEVICE, AND SIGNAL DEMODULATION METHOD AND PROGRAM USED THEREIN

TECHNICAL FIELD

The present invention relates to a wireless base station receiving device, and a signal demodulation method and a signal demodulation program used therein. In particular, the present invention relates to a wireless base station receiving device that demodulates user signal components, which respectively correspond to a plurality of mobile terminals, from a received wireless signal, and to a signal demodulation method and a signal demodulation program used therein.

BACKGROUND ART

In a mobile communication system, mobile terminals and a wireless base station device communicate with each other through a wireless transmission channel. As communication methods for allowing a wireless base station device to communicate with a plurality of mobile terminals at the same time, FDMA (Frequency Division Multiple Access), TDMA (Time Division Multiple Access), CDMA (Code Division Multiple Access), OFDMA (Orthogonal Frequency Division Multiple Access), and the like have been put to practical use.

In a mobile communication system employing such a communication method, an interference occurring in uplink user signals (hereinafter referred to simply as "user signals"), which are transmitted from mobile terminals to a wireless base station device, is a major issue.

Specifically, a user signal transmitted from one mobile terminal passes through a plurality of different propagation paths due to reflection and diffraction, and is received by the wireless base station device as a plurality of multipath signals that reach with different delay times. The multipath signals interfere with each other, which deteriorates the reception quality of the user signal in the wireless base station device. In view of this, various techniques for suppressing a mutual interference among multipath signals (hereinafter, referred to as "multipath interference") have been proposed. For example, Patent Literatures 1 and 2 disclose a multipath interference canceller, and Patent Literatures 3 and 4 disclose a technique for suppressing a multipath interference using an adaptive array antenna. In addition, the multipath interference can also be suppressed using an equalizer.

One user signal interferes with another user signal existing at a time and a frequency domain which are identical with or close to those of the one user signal, which leads to deterioration of the reception quality in the wireless base station device. In view of this, various techniques for suppressing an interference caused by another user signal (hereinafter, referred to as "inter-user interference") have been proposed. For example, Patent Literature 5 discloses an inter-user interference canceller. In addition, the inter-user interference can also be suppressed using the above-mentioned adaptive array antenna. This is because the user signals can be spatially separated from each other so as to prevent the user signals from interfering with each other by controlling the reception directivity of the adaptive array antenna.

Furthermore, a user signal transmitted from a mobile terminal camping on a cell formed by another wireless base station device adjacent to one wireless base station device interferes with a user signal transmitted from a mobile terminal camping on a cell formed by the one wireless base station device. Also, a signal from another mobile communication system or the like interferes with the user signals. The inter-cell interface and the inter-system interface cause deterioration of the reception quality in the wireless base station device. In view of this, various techniques for suppressing the inter-cell interface and the inter-system interface have been proposed. The inter-cell interface and the inter-system interface can be suppressed using the above-mentioned adaptive array antenna, for example.

Hereinafter, a configuration and operation of a typical wireless base station device to which the interference suppression technique is applied will be described with reference to FIG. 5.

A wireless base station receiving device 1x shown in FIG. 5 includes a wireless receiving unit 10 and k (k is an arbitrary natural number) units of interference suppression demodulation blocks 30_1 to 30_k (hereinafter, also collectively denoted by reference numeral 30).

Among these, the wireless receiving unit 10 receives a wireless signal 101 including a plurality of user signal components respectively transmitted from a plurality of mobile terminals (not shown) through an antenna. Not only each user signal component, but also signal components caused by the inter-cell interface and inter-system interface, thermal noise, and the like are superimposed on the wireless signal 101. Multipath signal components corresponding to each user signal component are also present.

The wireless receiving unit 10 outputs a baseband digital signal (hereinafter, referred to as "baseband signal") 102, which is obtained by performing amplification, frequency conversion from a wireless frequency band to a baseband, quadrature detection, or the like on the wireless signal 101, to the interference suppression demodulation blocks 30_1 to 30_k in parallel. As in the wireless signal 101 described above, each user signal component, multipath signal components corresponding to each user signal component, signal components caused by the inter-cell interface and inter-system interface, thermal noise, and the like are superimposed on the baseband signal 102. The wireless receiving unit 10 typically includes a low noise amplifier, a band-limiting filter, a mixer, a local oscillator, an AGC (Auto Gain Controller), a quadrature detector, a low pass filter, and an A/D (Analog to Digital) converter, and the like.

On the other hand, each of the interference suppression demodulation blocks 30_1 to 30_k includes an extraction timing detection unit 31 and an interference suppression function-equipped demodulation unit 32.

The extraction timing detection unit 31 detects timings for extracting multipath signal components corresponding to one user signal (desired user signal) from the baseband signal 102, and outputs information (hereinafter, referred to as "extraction timing information") 104 indicating the timing to the interference suppression function-equipped demodulation unit 32. More specifically, the extraction timing detection unit 31 calculates a correlation between the desired user signal and the baseband signal 102 in a scanning manner by using information (a frequency band to be used, spreading code, or the like) unique to a desired user and known symbols (such as pilot symbol), thereby detecting the timings for extracting the multipath signal components.

The interference suppression function-equipped demodulation unit 32 refers to the extraction timing information 104 to extract multipath signal components at each extraction timing from the baseband signal 102. Further, the interference suppression function-equipped demodulation unit 32 estimates a wireless transmission channel for the desired user signal (estimates a phase fluctuation amount depending on wireless transmission paths), and removes a phase fluctuation component from the desired user signal by using the estimation result (for example, performs weighting and combining processing on multipath signal components after aligning the phases of the multipath signal components). The estimation of a wireless transmission channel can be performed using known symbols as described above, for example. Further, the interference suppression function-equipped demodulation unit 32 performs a predetermined interference suppression processing on the desired user signal from which the phase fluctuation component is removed, and outputs a demodulation signal in which various interferences are suppressed (hereinafter, referred to as "interference-suppressed user demodulation signal"). In other words, the interference suppression demodulation blocks 30_1 to 30_$k$ respectively output interference-suppressed user demodulation signals 103_1 to 103_$k$ (hereinafter, also correctively denoted by reference numeral 103) corresponding to user signal components from different mobile terminals.

Thus, the interference suppression processing is performed upon demodulation to thereby improve the quality of the user demodulation signal. This leads to an increase in uplink transmission capacity of the wireless base station device.

Incidentally, recent mobile communication systems employ techniques for controlling a modulation method and a coding method to be applied to user signals for each mobile terminal (for example, AMC (Adaptive Modulation and Coding) in CDMA).

In the mobile communication system employing such control techniques, user signals are more likely to be affected by an interference when a modulation method using a larger number of information bits per symbol is applied or when a coding method using a higher code rate is applied. In this case, the wireless base station receiving device preferably performs the interference suppression processing upon demodulation of user signals.

On the other hand, the user signals are less affected by an interference when a modulation method using a smaller number of information bits per symbol is applied or when a coding method using a lower code rate is applied. For this reason, even if the interference suppression processing is not carried out, high-quality user demodulation signals can be obtained in many cases without causing any problem in operation.

Accordingly, the use of the wireless station receiving device 1$x$ shown in FIG. 5 for the mobile communication systems employing the control techniques described above causes a problem of deterioration in efficiency of user signal demodulation processing including the interference suppression processing. This is because the wireless base station receiving device 1$x$ performs the interference suppression processing on all user signals including user signals in which the effect of the interference suppression processing is hardly obtained. Circuits for executing the interference suppression processing are typically large in size, while the circuit sizes are different depending on the contents of the processing. Additionally, a certain processing time is required to execute the interference suppression processing. In other words, in the wireless base station receiving device 1$x$, an interference suppression effect large enough to offset an increase in circuit size and processing time cannot be obtained.

For example, Patent Literature 6 discloses an interference suppression method to cope with the above-mentioned problem. In this interference suppression method, whether to perform interference suppression processing upon demodulation of a user signal is determined depending on a modulation method to be applied to the user signal.

CITATION LIST

Patent Literature

[Patent Literature 1] Japanese Unexamined Patent Application Publication No. 2002-271233
[Patent Literature 2] Japanese Unexamined Patent Application Publication No. 2005-354255
[Patent Literature 3] Japanese Unexamined Patent Application Publication No. 2003-258693
[Patent Literature 4] Japanese Unexamined Patent Application Publication No. 2004-153527
[Patent Literature 5] Japanese Unexamined Patent Application Publication No. 2003-152682
[Patent Literature 6] Japanese Unexamined Patent Application Publication No. 2003-051764

SUMMARY OF INVENTION

Technical Problem

However, Patent Literature 6 described above has a problem in that the effect of improving the efficiency of the user signal demodulation processing including the interference suppression processing is insufficient. This is because whether to perform the interference suppression processing is determined based only on the modulation method. For example, even in the case where a modulation method using a large number of information bits per symbol is applied, it is unnecessary (redundant) to carry out the interference suppression processing when a coding method using a high code rate is applied (i.e., when the user signal is provided with sufficient redundancy to improve the interference resistance of the user signal itself).

Therefore, it is an object of the present invention to provide a wireless base station receiving device capable of improving the efficiency of the user signal demodulation processing including the interference suppression processing, and a signal demodulation method and a signal demodulation program used therein.

Solution to Problem

In order to achieve the above-mentioned object, a wireless base station receiving device according to an exemplary aspect of the present invention includes: reception means for receiving a wireless signal including a plurality of user signal components respectively transmitted from a plurality of mobile terminals; and determination means for determining whether to perform a predetermined interference suppression processing upon demodulation of each user signal component from the wireless signal, according to a reception quality of each user signal component that needs to be guaranteed for each mobile terminal, and a transmission rate of each user signal component determined for each mobile terminal.

According to another exemplary aspect of the present invention, there is provided a signal demodulation method for a wireless base station receiving device. This signal demodulation method includes: receiving a wireless signal including a plurality of user signal components respectively transmitted from a plurality of mobile terminals; and determining whether to perform a predetermined interference suppression processing upon demodulation of each user signal component from the wireless signal, according a reception quality of each user signal component that needs to be guaranteed for each mobile terminal, and a transmission rate of each user signal component determined for each mobile terminal.

A signal demodulation program according to still another exemplary aspect of the present invention causes a wireless base station receiving device to execute: a process to receive a wireless signal including a plurality of user signal components respectively transmitted from a plurality of mobile terminals; and a process to determine whether to perform a predetermined interference suppression processing upon demodulation of each user signal component from the wireless signal, according a reception quality of each user signal component that needs to be guaranteed for each mobile terminal, and a transmission rate of each user signal component determined for each mobile terminal.

Advantageous Effects of Invention

In the present invention, attention is focused on the fact that a user signal is more likely to be affected by an interference with an increase in the transmission rate of the user signal and that interference suppression processing is more preferably performed with an increase in the reception quality of the user signal that needs to be guaranteed for a mobile terminal, regardless of combined conditions of a modulation method and a coding method, or the like. Further, it is determined whether to perform the interference suppression processing according to these transmission rate and reception quality. Consequently, compared to Patent Literature 6 described above, the user signal demodulation efficiency can be drastically improved. Moreover, the present invention also provides an advantage of obtaining a sufficient interference suppression effect while suppressing an increase in circuit size and processing time in a wireless base station receiving device.

DESCRIPTION OF EMBODIMENTS

Figure 1:
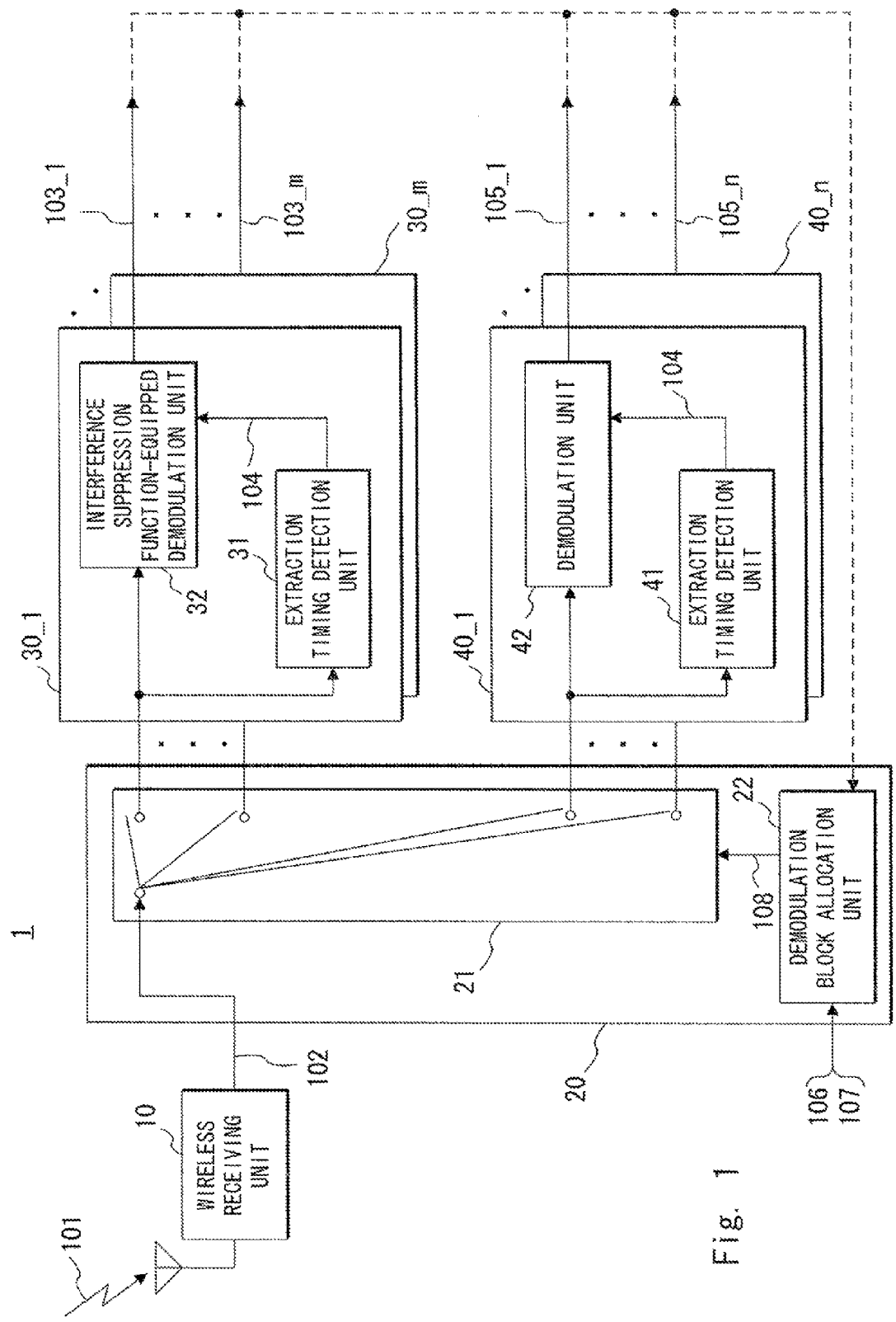
FIG. 1 is a block diagram showing a configuration example of a wireless base station receiving device according to an exemplary embodiment of the present invention.

Hereinafter, exemplary embodiments of a signal demodulation method according to the present invention and a wireless base station receiving device to which the method is applied will be described with reference to FIGS. 1 to 4. Note that the same components are denoted by the same reference numerals through the drawings, and redundant description is omitted as needed for clarity of description.

A wireless base station receiving device 1 according to this exemplary embodiment shown in FIG. 1 includes a wireless receiving unit 10, an interference suppression determination unit 20, m (m<k shown in FIG. 5) units of interference suppression demodulation blocks 30_1 to 30_$m$, and n (n<k) units of normal demodulation blocks 40_1 to 40_$n$ (hereinafter, also collectively denoted by reference numeral 40). Note that there are no limitations on the communication method employed by the wireless base station receiving device 1. The wireless base station receiving device 1 may employ any of the above-described FDMA, TDMA, CDMA, OFDMA, and the like.

Figure 5:
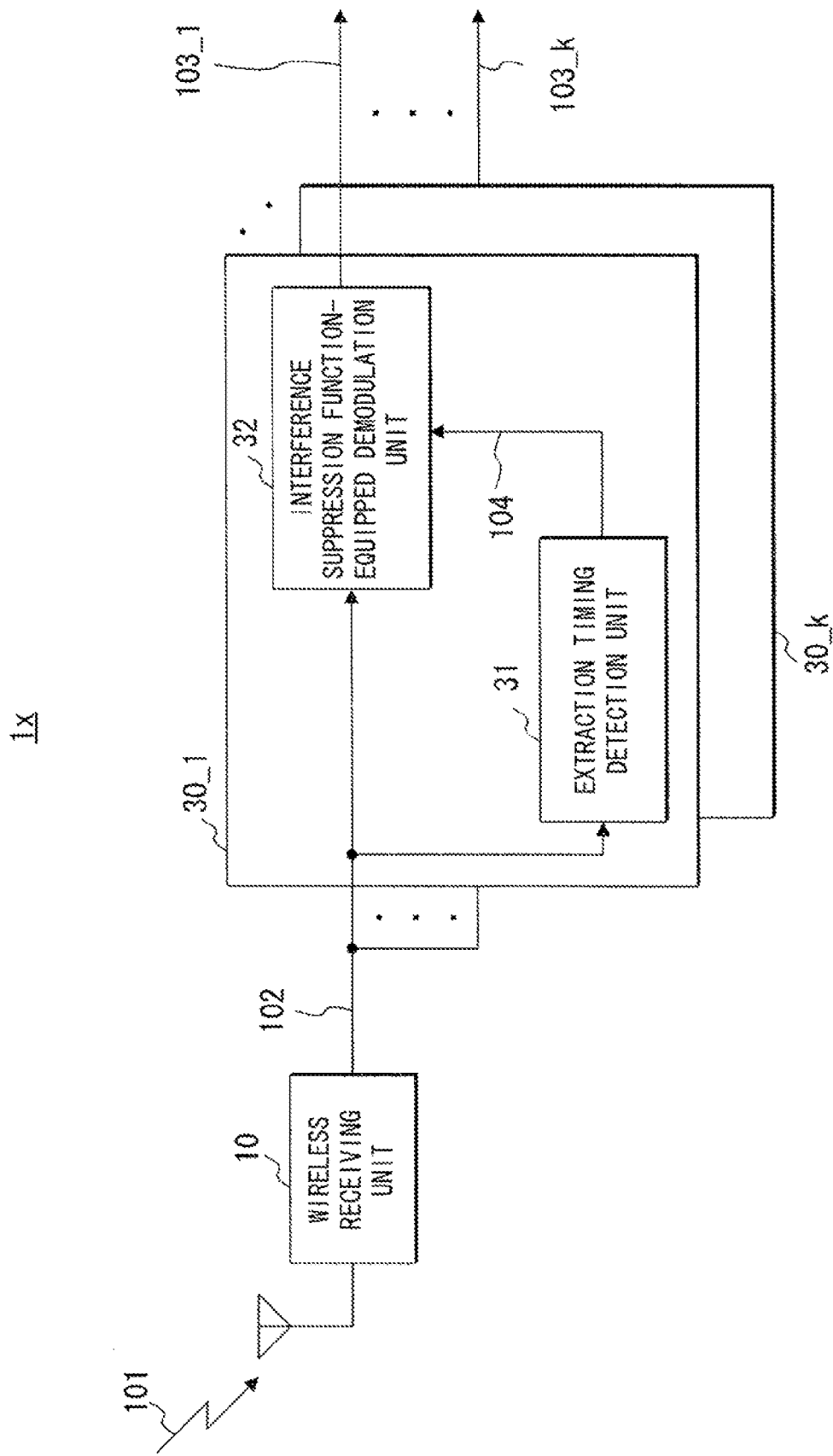
FIG. 5 is a block diagram showing a configuration example of a typical wireless base station receiving device to which an interference suppression technique is applied.

Among these, as the wireless receiving unit 10, a wireless receiving unit similar to that shown in FIG. 5 can be used. Note that there are no limitations on the number of antenna elements in an antenna used for the wireless receiving unit 10, and on the layout of the antenna elements.

As the interference suppression demodulation blocks 30_1 to 30_$m$, interference suppression demodulation blocks similar to those shown in FIG. 5 can be used. There are no limitations on interference suppression processing to be executed by an interference function-equipped demodulation unit 32 in the interference suppression demodulations block 30. In other words, the interference function-equipped demodulation unit 32 may execute processing in accordance with various interference suppression techniques as described above. There are no limitations on the type of interference to be suppressed. The interference function-equipped demodulation unit 32 can suppress various interferences as described above.

Each of the normal demodulation blocks 40_1 to 40_$n$ includes an extraction timing detection unit 41 and a demodulation unit 42. The extraction timing detection unit 41 has a function equivalent to the extraction timing detection unit 31 in the interference suppression demodulation block 30. On the other hand, the demodulation unit 42 differs from the interference suppression function-equipped demodulation unit 32 in the interference suppression demodulation block 30 in that the demodulation unit 42 does not execute the interference suppression processing upon demodulation of a user signal. In the description hereinbelow, demodulation signals respectively output from the normal demodulation blocks 40_1 to 40_$n$ without suppressing an interference are referred to as normal user demodulation signals and are denoted by reference numerals 105_1 to 105_$n$ (hereinafter, also collectively denoted by reference numeral 105). Thus, the normal user demodulation signal is distinguished from the interference-suppressed user demodulation signal 103 output from the interference suppression demodulation block 30. The interference-suppressed user demodulation signal and the normal user demodulation signal are also collectively referred to as user demodulation signals.

The interference suppression determination unit 20 determines whether to perform a predetermined interference suppression processing on each user signal component from a baseband signal 102 with reference to information (hereinafter, referred to as "reception quality information") 106 about a reception quality of each user signal component that needs to be guaranteed for each mobile terminal (not shown) and information (hereinafter, referred to as "transmission rate information") 107 about a transmission rate of each user signal component determined for each mobile terminal. The interference suppression determination unit 20 acquires the reception quality information 106 and the transmission rate information 107 as described later.

More specifically, as shown in FIG. 1, it is preferable that the interference suppression determination unit 20 is simply configured using a conduction switching unit 21 and a demodulation block allocation unit 22. The conduction switching unit 21 switches conduction states of signals among the wireless receiving unit 10, the interference suppression demodulation blocks 30_1 to 30_m, and the normal demodulation blocks 40_1 to 40_n in accordance with a switching instruction 108 from the demodulation block allocation unit 22. On the other hand, the demodulation block allocation unit 22 determines the allocation number of each of the interference suppression demodulation blocks 30 and the normal demodulation blocks 40 to be operated upon demodulation of each user signal component, based on the reception quality information 106 and the transmission rate information 107, and generates the switching instruction 108 indicating each allocation number. Thus, the baseband signal 102 is commonly supplied to a number of interference suppression demodulation blocks 30 and a number of normal demodulation blocks 40 corresponding to the respective allocation numbers, so that the user demodulation signals corresponding to the respective user signal components are output in parallel.

As the reception quality information 106 described above, various signal quality indices (for example, a tolerable error rate of a user demodulation signal) can be used. On the other hand, the transmission rate information 107 is preferably obtained under combined conditions of a modulation method and a coding method to be applied to each user signal component (i.e., based on information bits per symbol of a user signal, and a component ratio between systematic bits and redundant bits in the information bits). This is because the modulation method and the coding method are generally transmitted between each mobile terminal and the wireless base station device (i.e., existing information can be effectively used), regardless of whether or not the mobile communication system employs a control technique such as AMC.

The demodulation block allocation unit 22 may obtain the reception quality information 106 and the transmission rate information 107 from the interference-suppressed user demodulation signal 103 and the normal user demodulation signal 105 which are fed back as indicated by dashed lines in FIG. 1. In this case, the mobile terminal can request to change the allocation of each of the interference suppression demodulation block 30 and the normal demodulation block 40.

Thus, in this exemplary embodiment, whether to execute the interference suppression processing is determined according to the reception quality and the transmission rate, thereby drastically improving the efficiency for demodulating user signals. Further, there is no need to ensure resources for the interference suppression processing of all mobile terminals, which leads to a reduction in circuit size and processing time of the wireless base station receiving device.

Next, a specific operation example of this exemplary embodiment will be described with reference to FIGS. 2 to 4.

Figure 2:
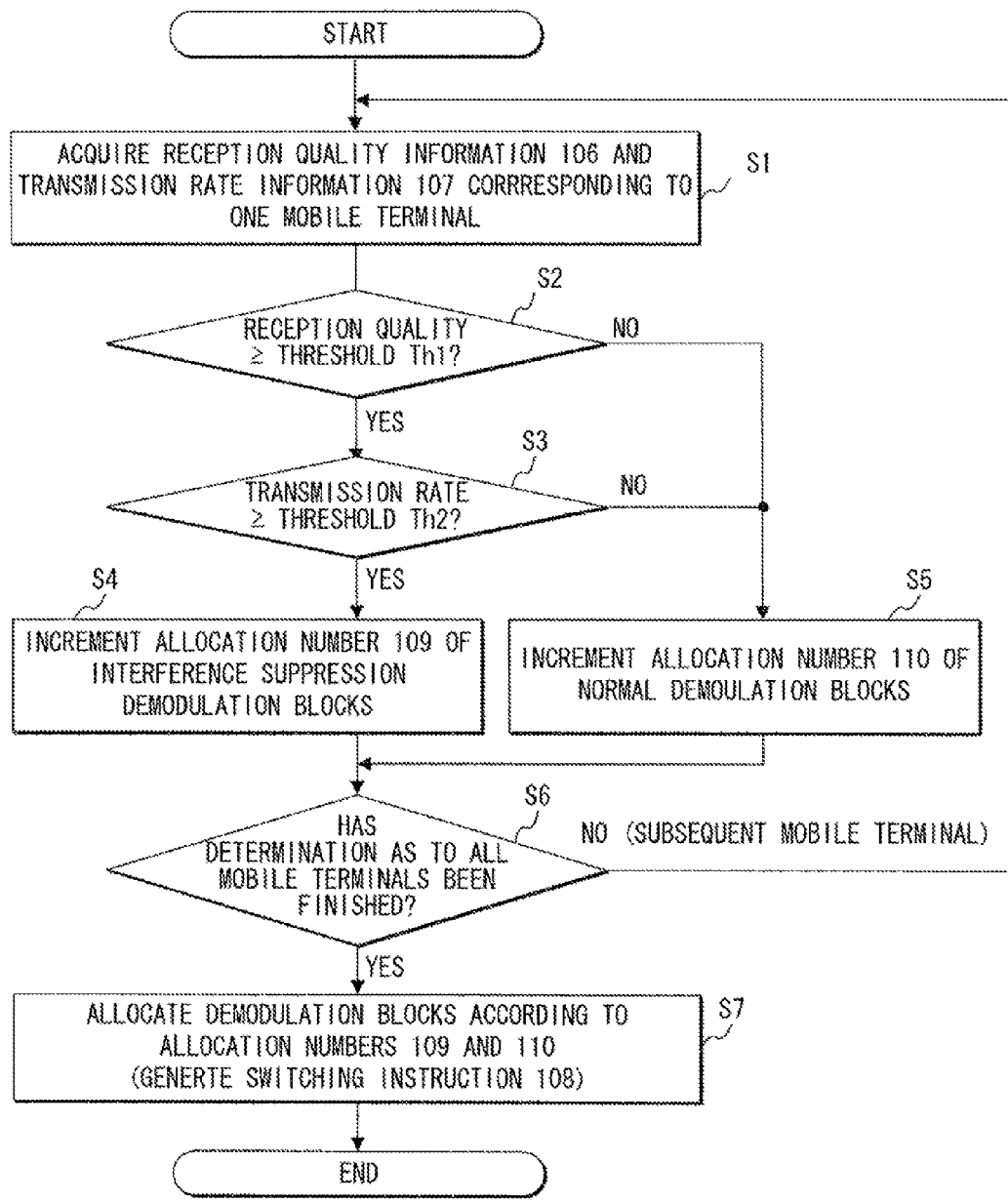
FIG. 2 is a flowchart showing exemplary processing of allocating demodulation blocks in a wireless base station receiving device according to an exemplary embodiment of the present invention.

As shown in FIG. 2, the demodulation block allocation unit 22 firstly controls the wireless receiving unit 10 and a wireless transmitting unit (not shown), and executes any of the following processings (1) to (3) to acquire the reception quality information 106 and the transmission rate information 107 corresponding to one mobile terminal among a plurality of counterpart mobile terminals (step S1).

(1) Processing of reading out the reception quality information 106 and the transmission rate information 107 corresponding to the one mobile terminal from among the reception quality information and transmission rate information on which each mobile terminal has been instructed upon start of communication and which are stored in a memory (not shown) or the like.

(2) Processing of extracting the reception quality information 106 and the transmission rate information 107 from a control signal transmitted from the one mobile terminal in advance of the user signal.

(3) Processing of receiving the reception quality information 106 and the transmission rate information 107 from the one mobile terminal through a common channel usable by each mobile terminal.

Then, the demodulation block allocation unit 22 determines whether or not the reception quality indicated by the acquired reception quality information 106 is equal to or greater than a predetermined threshold Th1 (step S2). As a result, when determining that the reception quality is equal to or greater than the threshold Th1, the demodulation block allocation unit 22 further determines whether or not the transmission rate indicated by the acquired transmission rate information 107 is equal to or greater than a predetermined threshold Th2 (step S3). As a result, when determining that the transmission rate is equal to or greater than the threshold Th2, the demodulation block allocation unit 22 increments by "1" an allocation number 109 of interference suppression demodulation blocks (step S4). Note that the initial value of the allocation number 109 is "0".

Meanwhile, when the reception quality < the threshold Th1 holds in step S2 described above, or when the transmission rate < the threshold Th2 holds in step S3 described above, the demodulation block allocation unit 22 increments by "1" an allocation number 110 of normal demodulation blocks (step S5). Note that the initial value of the allocation number 110 is "0".

Then, the demodulation block allocation unit 22 determines whether or not the determination (determinations in steps S2 and S3 described above) as to all counterpart mobile terminals has been finished (step S6). As a result, if the determination has not been finished, the demodulation block allocation unit 22 executes steps S1 to S5 again to make a determination as to the subsequent mobile terminal.

On the other hand, if the determination as to all mobile terminals has been finished, the demodulation block allocation unit 22 generates the switching instruction 108, in which the allocation numbers 109 and 110 are set, and allocates a number of demodulation blocks corresponding to the allocation numbers 109 and 110. More specifically, the conduction switching unit 21 provides electrical conduction between the wireless receiving unit 10 and a number of interference suppression demodulation blocks 30 corresponding to the allocation number 109. At the same time, the conduction switching unit 21 provides electrical conduction between the wireless receiving unit 10 and a number of normal demodulation blocks 40 corresponding to the allocation number 110.

As described above, the extraction timing detection unit 31 in each of the interference suppression demodulation blocks 30, which are electrically conductive with the wireless receiving unit 10, detects timings for extracting multipath signal components corresponding to a desired user signal, and supplies the interference suppression function-equipped demodulation unit 32 with extraction timing information 104 indicating the timings. In the case of improving the reliability of the extraction timing, or when there are limitations on the number of extraction timings (sampling points) that can be processed by the interference suppression function-equipped demodulation unit 32, for example, the extraction timing detection unit 31 selects one of the extraction timings satisfying the following criteria (4) to (7), for example. However, the criteria for selection are not limited to the following criteria (4) to (7).

(4) Extraction timings corresponding to multipath signal components whose received power is in the top L-th (L is an arbitrary natural number) level among a plurality of multipath signal components.

(5) Extraction timings corresponding to the multipath signal components whose SIR (Signal to Interference Ratio) is in the top L-th level.

(6) Extraction timings corresponding to multipath signal components whose received power is greater than a predetermined threshold.

(7) Extraction timings corresponding to multipath signal components whose SIR is greater than a predetermined threshold.

As described above, the interference suppression function-equipped demodulation unit 32 extracts multipath signal components from the baseband signal 102, estimates a wireless transmission channel for a desired user signal, removes a phase fluctuation component from the desired user signal, and performs a predetermined interference suppression processing, thereby outputting the interference-suppressed user demodulation signal 103. In order to improve the accuracy of the wireless transmission channel estimation, the interference suppression function-equipped demodulation unit 32 may perform in-phase addition. The term "in-phase addition" refers to a vector (complex) addition of a plurality of successive channel estimation results. There is no limitation on the executable unit for the in-phase addition. For example, the in-phase addition is carried out in the unit of symbol or slot. The length of the in-phase addition is also not limited. Further, there is no limitation on the weighting and combining method upon removal of a phase fluctuation component. For example, the interference suppression function-equipped demodulation unit 32 may perform weighting based on the received power of each multipath signal component, or may perform weighting based on the SIR of each multipath signal component.

On the other hand, the extraction timing detection unit 41 in each of the normal demodulation blocks 40, which are electrically conductive with the wireless receiving unit 10, executes processing similar to that of the extraction timing detection unit 31 in the interference suppression demodulation block 30. The demodulation unit 42 extracts multipath signal components from the baseband signal 102, estimates a wireless transmission channel for a desired user signal, and removes a phase fluctuation component, thereby outputting the normal user demodulation signal 105. The processing of extracting the multipath signal components, the processing of estimating the wireless transmission channel, and the processing of removing the phase fluctuation component in the demodulation unit 42 are similar to those executed by the interference suppression function-equipped demodulation unit 32 in the interference suppression demodulation block 30.

After that, the wireless base station receiving device 1 executes processing of reallocating the demodulation blocks in the case where a mobile terminal is instructed to change the reception quality and the transmission rate and in the case where the reception quality information and the transmission rate information included in the user demodulation signal are changed.

Figure 3:
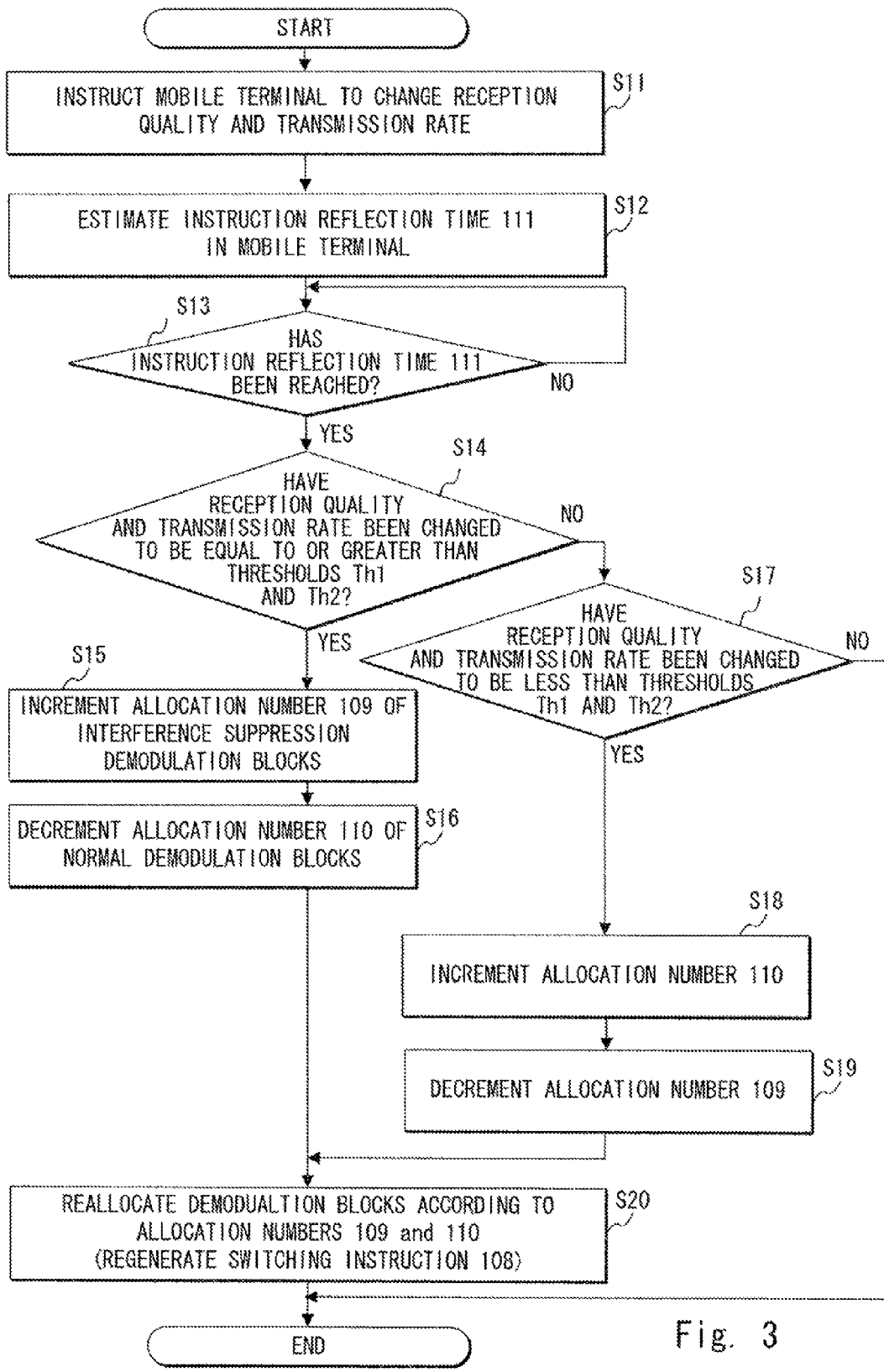
FIG. 3 is a flowchart showing exemplary processing of reallocating demodulation blocks in a wireless base station receiving device according to an exemplary embodiment of the present invention.

Specifically, as shown in FIG. 3, the demodulation block allocation unit 22 controls the wireless receiving unit 10 and the wireless transmitting unit to instruct a mobile terminal to change the reception quality and the transmission rate (step S11). The instruction is generated based on a request from the mobile terminal, and is also generated using an increase or decrease in processing load, for example, in the wireless base station receiving device 1 as a trigger.

At this time, the demodulation block allocation unit 22 estimates a reflecting time 111 when the instruction is reflected in the mobile terminal (hereinafter, referred to as "instruction reflection time"), and waits for arrival of the instruction reflection time 111 (steps S12 and 13). The instruction reflection time 111 can be easily estimated based on the state of propagation paths, the spec of the mobile terminal, or the like.

When the instruction reflection time 111 is reached, the demodulation block allocation unit 22 determines whether the reception quality and the transmission rate have changed to be equal to or greater than the thresholds Th1 and Th2, respectively, according to the own instruction (step S14). As a result, when the change is detected, the demodulation block allocation unit 22 increments by "1" the allocation number 109 of the interference suppression demodulation blocks and decrements by "1" the allocation number 110 of the normal demodulation blocks (steps S15 and S16).

Meanwhile, when the change is not detected in step S14 described above, the demodulation block allocation unit 22 further determines whether the reception quality and the transmission rate have changed to be less than the thresholds Th1 and Th2, respectively, according to the own instruction (step S17). As a result, when the change is detected, the demodulation block allocation unit 22 increments by "1" the allocation number 110 of the normal demodulation blocks and decrements by "1" the allocation number 109 of the interference suppression demodulation blocks (steps S18 and S19).

Then, the demodulation block allocation unit 22 regenerates the switching instruction 108 in which the updated allocation numbers 109 and 110 are set, to thereby reallocate the demodulation blocks corresponding to the allocation numbers 109 and 110 (step S20). When the change is not detected in both steps S14 and S17 described above, the demodulation block allocation unit 22 does not change the allocation of the demodulation blocks.

Figure 4:
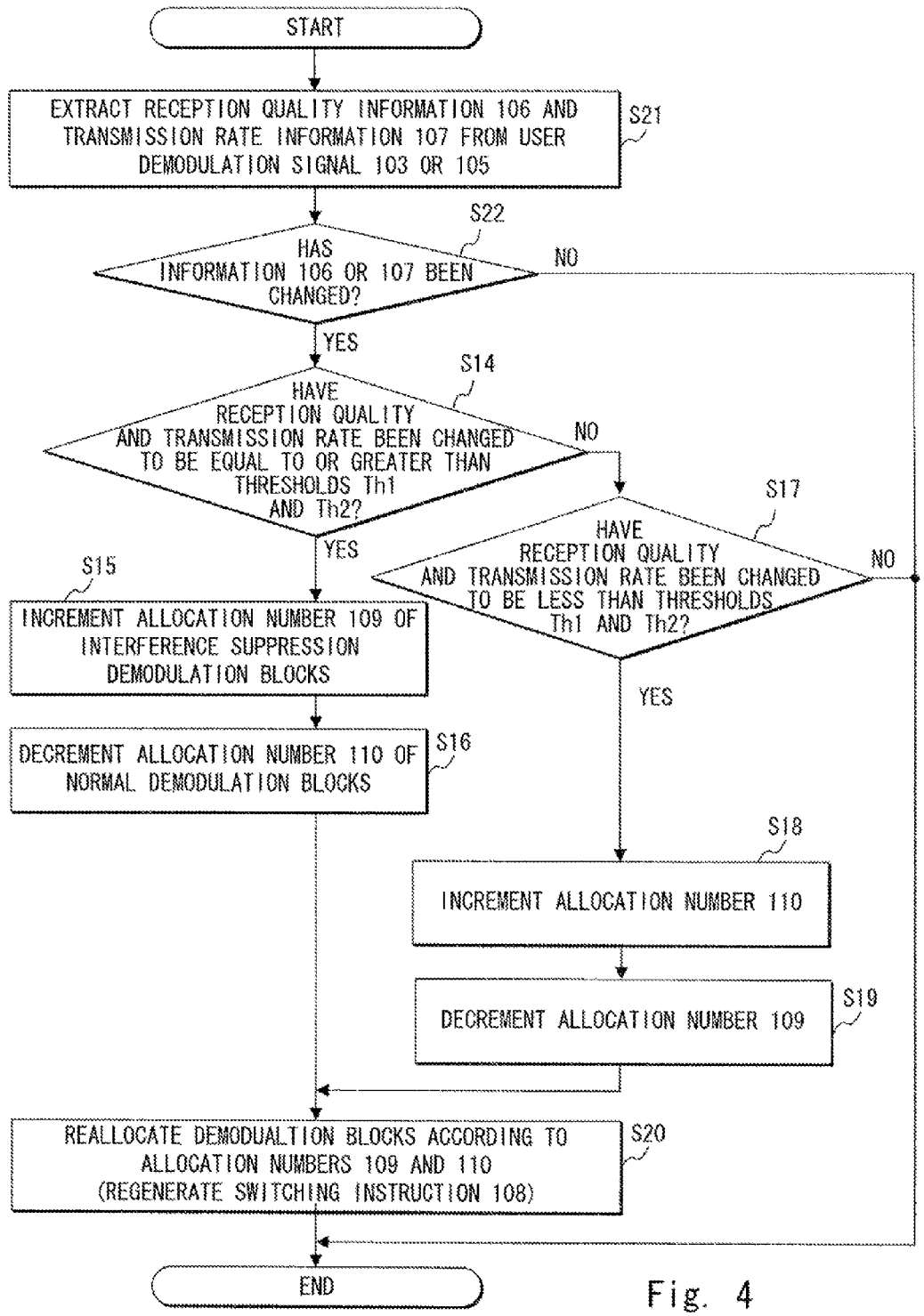
FIG. 4 is a flowchart showing another exemplary processing of reallocating demodulation blocks in a wireless base station receiving device according to an exemplary embodiment of the present invention.

As shown in FIG. 4, the demodulation block allocation unit 22 extracts the reception quality information 106 and the transmission rate information 107 from the user demodulation signals 103 and 105 every time the user demodulation signals 103 and 105 are fed back from the interference suppression demodulation blocks 30 and the normal demodulation blocks 40 (step S21).

Then, the demodulation block allocation unit 22 determines whether the extracted reception quality information 106 or transmission rate information 107 has been changed from the information used upon the previous demodulation block allocation (step S22). As a result, when the change is detected (i.e., when a mobile terminal requests to change allocation of demodulation blocks), the demodulation block allocation unit 22 executes steps S14 to S20 described above to reallocate the demodulation blocks. If the change is not detected in step S22, the demodulation block allocation unit 22 does not change the allocation of the demodulation blocks.

Thus, the allocation of the demodulation blocks can be dynamically changed at the initiative of the wireless base station device or mobile terminal. Therefore, the wireless base station receiving device 1 is suitable as a mobile communication system employing a control technique such as AMC.

The present invention is not limited to the above exemplary embodiments, but can be modified in various ways that are apparent to those skilled in the art within the scope of claims. For example, each processing illustrated in the above exemplary embodiments can be provided as a program for causing a wireless base station receiving device to execute the processing. In this case, the program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R, CD-R/W, and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line, such as electric wires or optical fibers, or a wireless communication line. Although in the above exemplary embodiments, an algorithm using a threshold is applied to the processing of allocating and reallocating demodulation blocks, the algorithm is not limited thereto. Any algorithm can be applied as long as the interference suppression processing can easily be executed with an increase in the reception quality and the transmission rate, and the interference suppression processing can hardly be executed with a decrease in the reception quality and the transmission rate.

This application is based upon and claims the benefit of priority from Japanese patent application No. 2009-166452, filed on Jul. 15, 2009, the disclosure of which is incorporated herein in its entirety by reference.

INDUSTRIAL APPLICABILITY

The present invention is applied to a wireless base station receiving device, and a signal demodulation method and a signal demodulation program used therein. In particular, the present invention is applied to a wireless base station receiving device that demodulates user signal components respectively corresponding to a plurality of mobile terminals from a received wireless signal, and to a signal demodulation method and a signal demodulation program used therein.

REFERENCE SIGNS LIST

1 WIRELESS BASE STATION RECEIVING DEVICE
10 WIRELESS RECEIVING UNIT
20 INTERFERENCE SUPPRESSION DETERMINATION UNIT
21 CONDUCTION SWITCHING UNIT
22 DEMODULATION BLOCK ALLOCATION UNIT
30, 30_1 to 30_m INTERFERENCE SUPPRESSION DEMODULATION BLOCK
31, 41 EXTRACTION TIMING DETECTION UNIT
32 INTERFERENCE SUPPRESSION FUNCTION-EQUIPPED DEMODULATION UNIT
40, 40_1 to 40_n NORMAL DEMODULATION BLOCK
42 DEMODULATION UNIT
101 WIRELESS SIGNAL
102 BASEBAND SIGNAL
103, 103_1 to 103_m INTERFERENCE-SUPPRESSED USER DEMODULATION SIGNAL
104 EXTRACTION TIMING INFORMATION
105, 105_1 to 105_n NORMAL USER DEMODULATION SIGNAL
106 RECEPTION QUALITY INFORMATION
107 TRANSMISSION RATE INFORMATION
108 SWITCHING INSTRUCTION
109, 110 ALLOCATION NUMBER
111 INSTRUCTION REFLECTION TIME
Th1, Th2 THRESHOLD

The invention claimed is:

1. A wireless base station receiving device comprising:
hardware;
a reception unit, implemented at least by the hardware, that receives a wireless signal including a plurality of user signal components respectively transmitted from a plurality of mobile terminals; and
a determination unit, implemented at least by the hardware, that determines whether to perform a predetermined interference suppression processing upon demodulation of each user signal component from the wireless signal, according to a reception quality of each user signal component that needs to be guaranteed for each mobile terminal, and a transmission rate of each user signal component determined for each mobile terminal.

2. The wireless base station receiving device according to claim 1, wherein, upon the demodulation, the determination unit determines to perform the interference suppression processing when the reception quality and the transmission rate are equal to or greater than respective predetermined thresholds, and determines not to perform the suppression processing in the other cases.

3. The wireless base station receiving device according to claim 1, further comprising:
a plurality of first demodulation units, implemented at least by the hardware, that execute the interference suppression processing to demodulate one user signal component from the wireless signal; and
a plurality of second demodulation units, implemented at least by the hardware, that demodulate one user signal component from the wireless signal without executing the interference suppression processing,
wherein the determination unit causes a number of the first demodulation units corresponding to the number of user signal components determined to be subjected to the interference suppression processing to operate, and causes a number of the second demodulation units corresponding to the number of user signal components determined not to be subjected to the interference suppression processing to operate.

4. The wireless base station receiving device according to claim 1, wherein the determination unit instructs the mobile terminals on the reception quality and the transmission rate.

5. The wireless base station receiving device according to claim 4, wherein the determination unit estimates a reflection time of the instruction in the mobile terminals, and redetermines whether to perform the interference suppression processing upon demodulation of user signal components transmitted from the mobile terminals after the reflection time, according to the instructed reception quality and transmission rate.

6. The wireless base station receiving device according to claim 1, wherein the determination unit acquires the reception quality and the transmission rate from a control signal transmitted from each of the mobile terminals in advance of each user signal component.

7. The wireless base station receiving device according to claim 1, wherein the determination unit acquires each reception quality and each transmission rate through a common channel usable by the mobile terminals.

8. The wireless base station receiving device according to claim 1, wherein the determination unit acquires the reception quality and the transmission rate from user signal components obtained by the demodulation.

9. The wireless base station receiving device according to claim 1, wherein the determination unit obtains the transmission rate based on combined conditions of a modulation method and a coding method to be applied to each user signal component by each mobile terminal.

10. A signal demodulation method used in a wireless base station receiving device, comprising:
  receiving a wireless signal including a plurality of user signal components respectively transmitted from a plurality of mobile terminals; and
  determining whether to perform a predetermined interference suppression processing upon demodulation of each user signal component from the wireless signal, according to a reception quality of each user signal component that needs to be guaranteed for each mobile terminal, and a transmission rate of each user signal component determined for each mobile terminal.

11. The signal demodulation method according to claim 10, including, upon the demodulation, determining to perform the interference suppression processing when the reception quality and the transmission rate are equal to or greater than respective predetermined thresholds, and determining not to perform the suppression processing in the other cases.

12. The signal demodulation method according to claim 10, including instructing the mobile terminals on the reception quality and the transmission rate.

13. The signal demodulation method according to claim 12, further comprising:
  estimating a reflection time of the instruction in the mobile terminals; and
  redetermining whether to perform the interference suppression processing upon demodulation of user signal components transmitted from the mobile terminals after the reflection time, according to the instructed reception quality and transmission rate.

14. The signal demodulation method according to claim 10, including acquiring the reception quality and the transmission rate from a control signal transmitted from each of the mobile terminals in advance of each user signal component.

15. The signal demodulation method according to claim 10, including acquiring each reception quality and each transmission rate through a common channel usable by the mobile terminals.

16. The signal demodulation method according to claim 10, including acquiring the reception quality and the transmission rate from user signal components obtained by the demodulation.

17. The signal demodulation method according to claim 10, including obtaining the transmission rate based on combined conditions of a modulation method and a coding method to be applied to each user signal component by each mobile terminal.

18. A non-transitory computer readable medium storing a signal demodulation program for causing a wireless base station receiving device to execute:
  a process to receive a wireless signal including a plurality of user signal components respectively transmitted from a plurality of mobile terminals; and
  a process to determine whether to perform a predetermined interference suppression processing upon demodulation of each user signal component from the wireless signal, according to a reception quality of each user signal component that needs to be guaranteed for each mobile terminal, and a transmission rate of each user signal component determined for each mobile terminal.

* * * * *